United States Patent
Zaydman

(10) Patent No.: US 10,552,075 B2
(45) Date of Patent: Feb. 4, 2020

(54) DISK-IMAGE DEDUPLICATION WITH HASH SUBSET IN MEMORY

(71) Applicant: VMWARE, INC., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 13 days.

(21) Appl. No.: 15/877,566

(22) Filed: Jan. 23, 2018

(65) Prior Publication Data

US 2019/0227726 A1 Jul. 25, 2019

(51) Int. Cl.
- *G06F 3/06* (2006.01)
- *G06F 16/11* (2019.01)
- *G06F 9/455* (2018.01)

(52) U.S. Cl.
CPC .......... *G06F 3/0641* (2013.01); *G06F 16/113* (2019.01); *G06F 16/128* (2019.01); *G06F 9/45533* (2013.01)

(58) Field of Classification Search
CPC .... G06F 3/0641; G06F 16/113; G06F 16/128; G06F 9/45533
See application file for complete search history.

(56) References Cited

U.S. PATENT DOCUMENTS

| | | | |
|---|---|---|---|
| 8,356,174 B2 | 1/2013 | Schwaab et al. | |
| 8,407,193 B2* | 3/2013 | Gruhl | G06F 3/0608 707/693 |
| 9,612,749 B2 | 4/2017 | Wang | |
| 2010/0174684 A1* | 7/2010 | Schwaab | G06F 11/1451 707/655 |
| 2011/0238635 A1* | 9/2011 | Leppard | G06F 16/1752 707/693 |
| 2013/0185266 A1* | 7/2013 | Horn | G06F 16/113 707/691 |
| 2013/0339319 A1 | 12/2013 | Woodward et al. | |
| 2014/0201478 A1* | 7/2014 | Gunda | G06F 3/0641 711/159 |
| 2014/0214776 A1 | 7/2014 | Bolte et al. | |
| 2015/0067283 A1 | 3/2015 | Basu et al. | |
| 2017/0371581 A1* | 12/2017 | Rueger | G06F 3/0641 |

* cited by examiner

*Primary Examiner* — Tasnima Matin
(74) *Attorney, Agent, or Firm* — Fish & Richardson P.C.

(57) ABSTRACT

Deduplication of virtual-machine disk images and other disk images can involve identifying the first clusters in a file. The clusters are hashed. The first-in-file hashes (generated from first-in-file clusters) are stored in an in-memory index, while the full set of hashes is streamed in order to find matches with the hashes stored in the in-memory index. First-in-file hashes in the stream are compared, while other hashes in the stream are compared only if the immediately preceding hash resulted in a match. Comparing non-first-in-file hashes requires disk accesses, but since such comparisons are conditioned on first-in-file matches, there are relatively likely to result in sequences of matches. The net effect is a relatively fast deduplication with compression approaching that resulting from a full comparison of all hashes.

20 Claims, 5 Drawing Sheets

DISK-IMAGE DEDUPLICATION WITH HASH SUBSET IN MEMORY

BACKGROUND

Deduplication is a data compression technique that can be used to reduce storage capacity required to store data and reduce the bandwidth required to transfer data. In the event a cluster (the smallest logical amount of disk space that can be allocated by a file system) of data appears more than once, all instances but one can be replaced by pointers to a single instance of the cluster. Each replacement, for example, of a 4 KB cluster can be replaced with a 64-bit pointer resulting in a 512-fold decrease in data size per replacement.

Data is commonly stored on hard disks in clusters, the size of which is determined by the hypervisor or other operating system controlling the disk. For newer hard disks, 4096 bytes (i.e., 4 KB) is a standard cluster size. Deduplication can be used to effectively increase the amount of data that can be stored by a hard disk. Virtual-machine disk images are also cluster based. Deduplication can be used to reduce the size of a virtual-machine image and thus the storage capacity and bandwidth required respectively to store and transfer the virtual-machine image.

Cluster-by-cluster comparisons for all clusters of a disk image can be resource intensive. Comparisons are performed by loading clusters into memory. Comparisons of clusters in memory can be performed relatively fast, but the loading of clusters from disk is time consuming.

To reduce the number of disk swaps required, the clusters can be hashed and the resulting hashes compared. For example, a 256-bit (32-byte) hash can be generated for each 32-kbit (4 KB) blocks, providing a 128-fold data reduction in the amount of data that must be held in memory per cluster to effect comparisons. However, it still may not be feasible to hold in memory hashes for all the clusters at once. Time consuming disk accesses may still be required. What is needed is an approach to deduplication that further reduces the number of disk accesses required.

DETAILED DESCRIPTION

Figure 1:
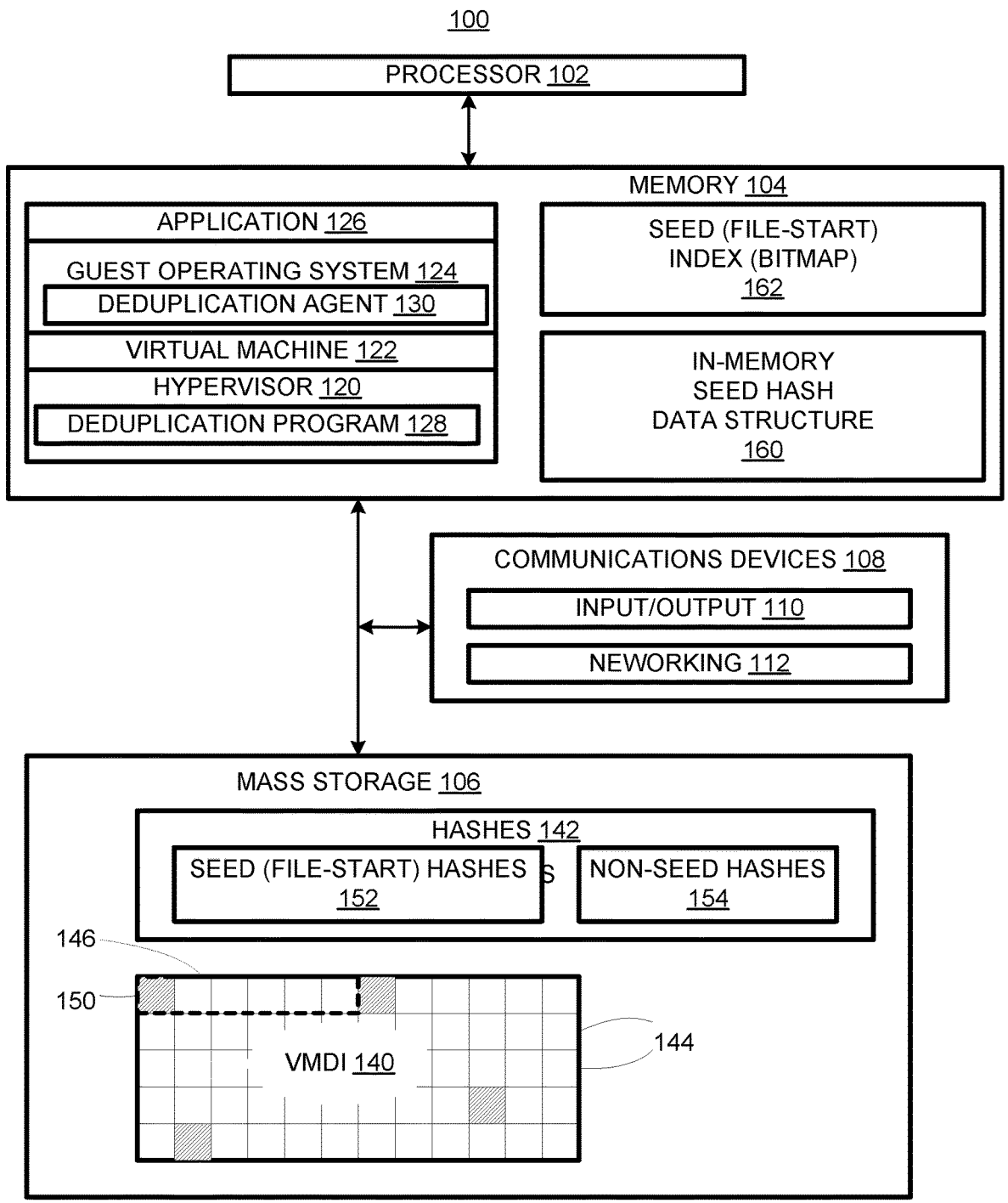
FIG. 1 is a schematic diagram of a computer system with a virtual-machine disk image to be deduplicated.

Hashes for selected "seed" clusters can be compared in memory. The seed clusters can be, for example, clusters aligned with file starts. Matches can trigger comparisons of neighboring clusters to leverage common sequences within files. Matched clusters and/or cluster sequences can be replaced with pointers to reduce the size of a virtual-machine disk image or other disk image. The reduced size can reduce the storage requirements for a disk image and/or reduce the bandwidth required to transfer a disk image. An advantage of the disclosed approach to deduplication is that much greater performance can be achieved with limited resources with a relatively low penalty regarding the amount of compression achieved.

Deduplication of virtual-machine disk images during storage and during transfer relies on matching clusters by matching hashes. This works because files in the guest file system are aligned on the cluster boundary, typically 4 KB. However, the matching process is both time consuming and takes a lot of memory. It is time consuming because there are a lot of hashes to process; it takes a lot of memory to store all the hashes to match with.

One way to tackle this problem is to use a database of hashes. Databases use indexing to find a given hash. However, since the hashes are effectively random, they render caching ineffective. Because of the ineffectiveness of caching, virtually all lookups in a database of hashes would result in at least one disk read, which would cause cluster matching to be slow.

Another way to tackle this problem is to store hashes in memory. However, storing all hashes in memory is impractical, because it would require too much memory. Comparing only hatches that can fit in memory can make matching less effective. Swapping hash partitions in and out of memory so that all hashes are compared would be slow due to the large number of disk swaps required. However, limiting the disk swaps to partitions with a high likelihood of hits can achieve an effective balance between speed and compression effectiveness, Virtual-machine guest file systems strive to store files in contiguous blocks of disk space, without fragmentation (and they are largely successful at it). Once the first cluster of a given file is matched, the rest of the file clusters can typically be found as the sequence of clusters immediately following the first cluster. Accordingly, only the first clusters of files need to be stored in memory, with succeeding (non-first) clusters fetched from disk only in the event the first cluster is matched. In this approach, it is important to be able to detect first clusters of files inside the disk layout.

One way to discover first clusters of files is to boot up a virtual machine, install an agent on it, and recursively scan the guest file system. Depending on context, this may or may not be desirable because: (1) the virtual-machine disk image must be booted up; (2) the disk image is altered by installing the agent; and (3) the agent must be developed and tested for every version of every guest operating system. Another way to discover first clusters of files is to parse the file system data structures. This may avoid the need to boot up the virtual machine. However, code must be developed to understand the on-disk layout of every supported guest file system.

Yet another way to discover first clusters of files is to apply an algorithm to the contents of each cluster in order to classify it as a file start. This approach works for most guest file systems and operating systems, likely including ones not yet developed. For example, some file types start with a known header, which typically starts with a so-called "magic number". For example, all PDF files start with 4 hex bytes "25 50 44 46" ("% PDF"), and all Windows executable files start with 2 hex bytes "54 AD" ("MZ"). Some files, like XML files, don't have a header, but still always start with the same bytes ("<?xml" in the case of XML).

There are numerous ways to process such information which vary slightly in efficiency. One way is to lookup the first two bytes of a cluster in the hash table. Such lookup would fail for most of the clusters, because most of the clusters are not the file starts. A result of this lookup is an instruction on how to proceed. For "% P" or "<?", a subsequent lookup of the either 4 bytes or 6 bytes would be ordered. For "MZ", a subsequent lookup of 36 bytes at the offset 0x4E may be ordered to match them to the text "This program cannot be run in DOS mode".

Some files, e.g., text files, do not have a header. However, file starts for such files can be frequently identified from the contents of the previous cluster. Since the size of a file typically is not divisible by the cluster size (e.g., 4096 bytes), we can identify last clusters of files with some degree of probability by looking for series of zeroes at the end of clusters not fully filled with zeroes. The more zeroes, the higher the probability. The cluster right after the last cluster of a file is likely a first cluster (of the next file).

It may be noted that the techniques used to find the first cluster for a file can also be used to find the last cluster of a preceding file. Other clusters within a file can be located, e.g., as offsets from the first cluster or the last cluster. Thus, there are alternative clusters that can be selected for representation by hashes in memory for matching purposes. Herein, the selected clusters are referred to as "seed" clusters, as they serve as a starting point for neighbor searches that follow a match of seed clusters. However, for many applications, e.g., those in which hashes are streamed, the first-file clusters are most useful seed clusters, and the resulting neighbor searches are successor searches.

Although other choices are available, the first-in-file clusters may be favored. First of all, selecting the first-in-file clusters as seeds can maximize the likelihood of matches. For example, starting with a 9-cluster text file, a minor edit to the text of the 5$^{th}$ cluster will not affect the first four clusters. While the content after the edit remains unchanged, the alignment of that content with the cluster boundaries for clusters 6-9 can change. Thus, no matches may be found for the 6-9$^{th}$ clusters. If the last or a near-to-the last cluster is selected as the seed, then no matches may be found for a file that actually has four matches (since the seed mismatch would preclude neighbor searching). Of course, if the modification were to the second cluster, only the first cluster would match. This match would only be found if the first-in-file cluster were selected as the seed.

Second, selecting the first-in-file cluster as the seed is most efficient where the matching is performed in a streaming fashion. Once a match between first-in-file clusters is found, a forward neighbor search can be implemented as the remaining clusters of the file are streamed following the first-in-file cluster. This advantage is further detailed below.

A computer system 100, shown in FIG. 1, includes a processor 102, memory 104, mass storage 106, and communications devices 108. Communications devices 108 include interfaces for input/output devices 110 such as keyboards, mice, displays, and printers, and network interface devices 112, such as network interface cards and host-bus adapters. Memory 104, which can be solid-state random-access memory (RAM), is shown storing a hypervisor 120, a virtual machine 122, a guest operating system 124, and an application 126. Hypervisor 120 includes a deduplication program 128 that matches clusters as described further below. Some embodiments include a deduplication program that is not included in a hypervisor instead of or in addition to a deduplication program within a hypervisor. For example, a separate deduplication program can be used to reduce bandwidth requirements when transferring a disk image over a network. In some embodiments, the guest-operating system 124 or other part of the virtual machine 122 can include a deduplication agent 130. Note that if virtual machine 122 is shut down, virtual-machine 122, guest operating system 124, and application 128 are not stored in memory, but have are retained as corresponding components in mass storage 106.

Mass storage 106 has encoded thereon a virtual machine disk image (VMDI) 140, and hashes 142 of clusters 144 of VMDI 140. VMDI 140 includes files 146, the first clusters 150 of which are shown shaded in FIG. 1. In other words, the shaded clusters are "seed" clusters, and the unshaded clusters are "non-seed" clusters. Hashes 142 include first-in-file ("seed") hashes 152 of first-in-file clusters 150 and non-seed hashes 154 of non-seed clusters. In-memory seed hash data structure 160 stores copies of (in-mass-storage) seed hashes 152.

During a deduplication process, a seed (file-start) bitmap 162 or other index is generated. The seed bitmap 162 associates seed clusters with their respective locations in mass storage. Hashes 142 are arranged in the same order as are their respective clusters; likewise, the bit values of bit map 162 are arranged in an order corresponding to the order of the respective hashes and clusters. Each bit of bitmap 162 indicates whether or not the respective cluster is a seed (first-in-file) cluster and whether or not the respective hash is a seed (first-in-file) hash. In some embodiments, e.g., in the context of intra-system deduplication, a seed bitmap is not generated or used.

Figure 2:
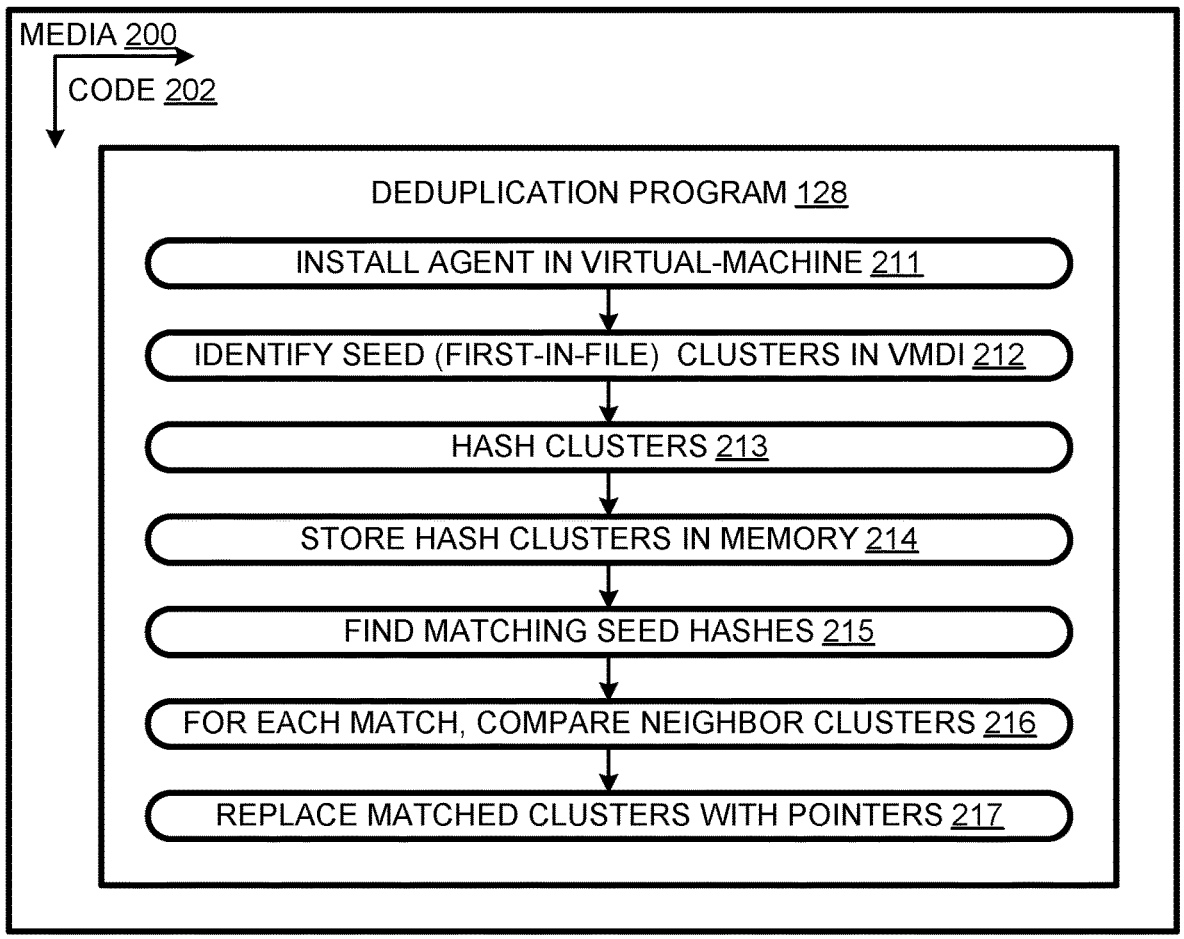
FIG. 2 is a hybrid schematic diagram of media encoded with code for deduplicating the virtual-machine disk image of FIG. 1.

As shown in FIG. 2, media 200 is encoded with code 202 that defines deduplication program 128. Media 200 can encompass mass storage such as mass storage 106 (FIG. 1) and memory such as memory 104. At 211, deduplication program can install or provide for installing a deduplication agent, e.g., agent 130, into a guest operating system or elsewhere in a virtual machine. In some scenarios, it may be infeasible or undesirable to install such an agent; accordingly, some embodiments forego this action.

Figure 3:
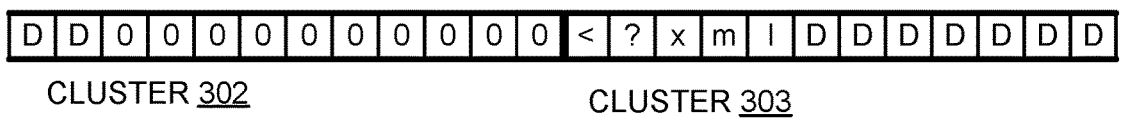
FIG. 3 is a schematic diagram of a pair of clusters for which a file-start can be identified.

At 212, first or other seed clusters of files in a virtual-machine disk image (VMDI) are identified. The identification can be represented by a bitmap or other index published by the deduplication agent and/or by scanning the clusters and detecting indicia of first clusters. These indicia include file headers and preceding zeroes, as indicated for clusters 302 and 304 in FIG. 3. The result can be a bitmap that distinguishes seed (first-in-file) clusters from non-seed clusters. The bits of the bitmap are arranged in the same order as the clusters are arranged in the virtual-machine or other disk image.

At 213, all clusters (first-in-file and otherwise) are hashed. This hashing can be performed just before the comparisons are performed or the hashing can occur on an ongoing basis, e.g., as clusters are created and modified. At 214, the first-in-file or other seed hashes are stored in memory. Actions 212 and 213, seed identification and hashing, can be performed in a single pass so that the hash data need only be read once.

At 215, comparisons are performed in memory to find matches with first-in-file hashes. In the event of a match, successor hashes are compared at 216. The successor comparisons continue until a mismatch is encountered or, in some embodiments, until some other condition, e.g., another first-in-file hash, an end of hash cluster, or end of disk image is reached.

At 217, matched clusters are replaced by pointers. In some cases, each matched cluster is replaced by a pointer identified a location of an equivalent cluster. However, greater compression can be achieved by replacing a sequence of clusters with start pointer and an end pointer or with a start pointer and a count of the number of clusters in the sequence.

Deduplication program 128 can be used to compress a disk image for storage or for transfer. In the case of transfer, it makes sense to perform the compression at the source rather than the target (aka, destination) so that transfer bandwidth is saved. However, in that case, at least one instance (namely, the instance that was not matched) of each cluster value (which may be shared by plural clusters in the disk image) must be transferred. If the target already has instances of some of the cluster values, e.g., in resident virtual-machine disk images or a master-cluster file, it may not be necessary to transfer instances of every cluster value represented in the subject disk image. The next example shows why this is the case.

Figure 4:
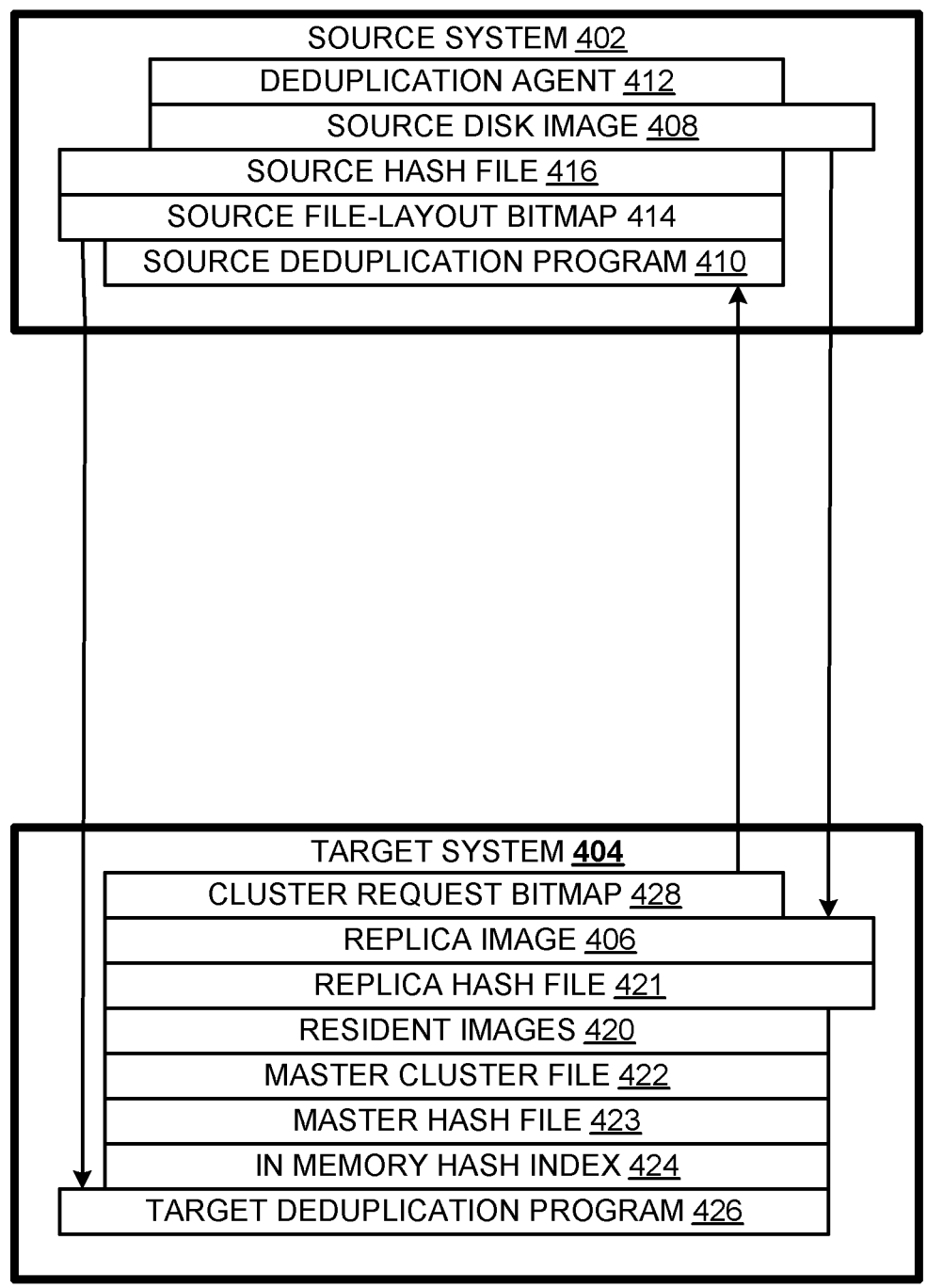
FIG. 4 is a schematic diagram of a network over which an image file is to be teleported.

As shown in FIG. 4, a network 400 includes a source system 402 and a target system 404. The intention here is to create on target system 404 a replica 406 of a source disk image 408 that resides on source system 402. Initially, source system 402 includes, in addition to source disk image 408, a deduplication program 410, and a deduplication agent 412 installed on a guest operating system. A source file-layout bitmap 414 and a source hash file 416 may be produced in preparation for transfer of disk image 408.

Target system 404 can include resident disk images 420, including disk images that have been compressed as described herein. A master cluster file 422 includes instances of first-in-file clusters and cluster sequences including first-in-file clusters found in the resident disk images. Instances of clusters in the resident disk images can have been replaced by pointers to instances of those clusters in the master cluster file. In addition, a replica hash file 421 for source hash file 416 is constructed at the target system.

Hashes for the resident clusters in the master cluster file 422 are stored in master hash file 423; the hashes in master hash file 423 are stored in the order in which their respective clusters are stored in master cluster file 422. In addition, hashes for first-in-file clusters in the master cluster file can be stored in an in-memory hash index 424; prior to creation of replica image 406, each hash in hash index 424 is stored in association with a pointer to the respective cluster in master cluster file 422. A target deduplication program 426 handles the deduplication process from the target end of the transfer, yielding a cluster request bitmap 428, which indicates which source clusters need to be transmitted and which do not need to be transferred because a match was or would be available at the source system.

Figure 5:
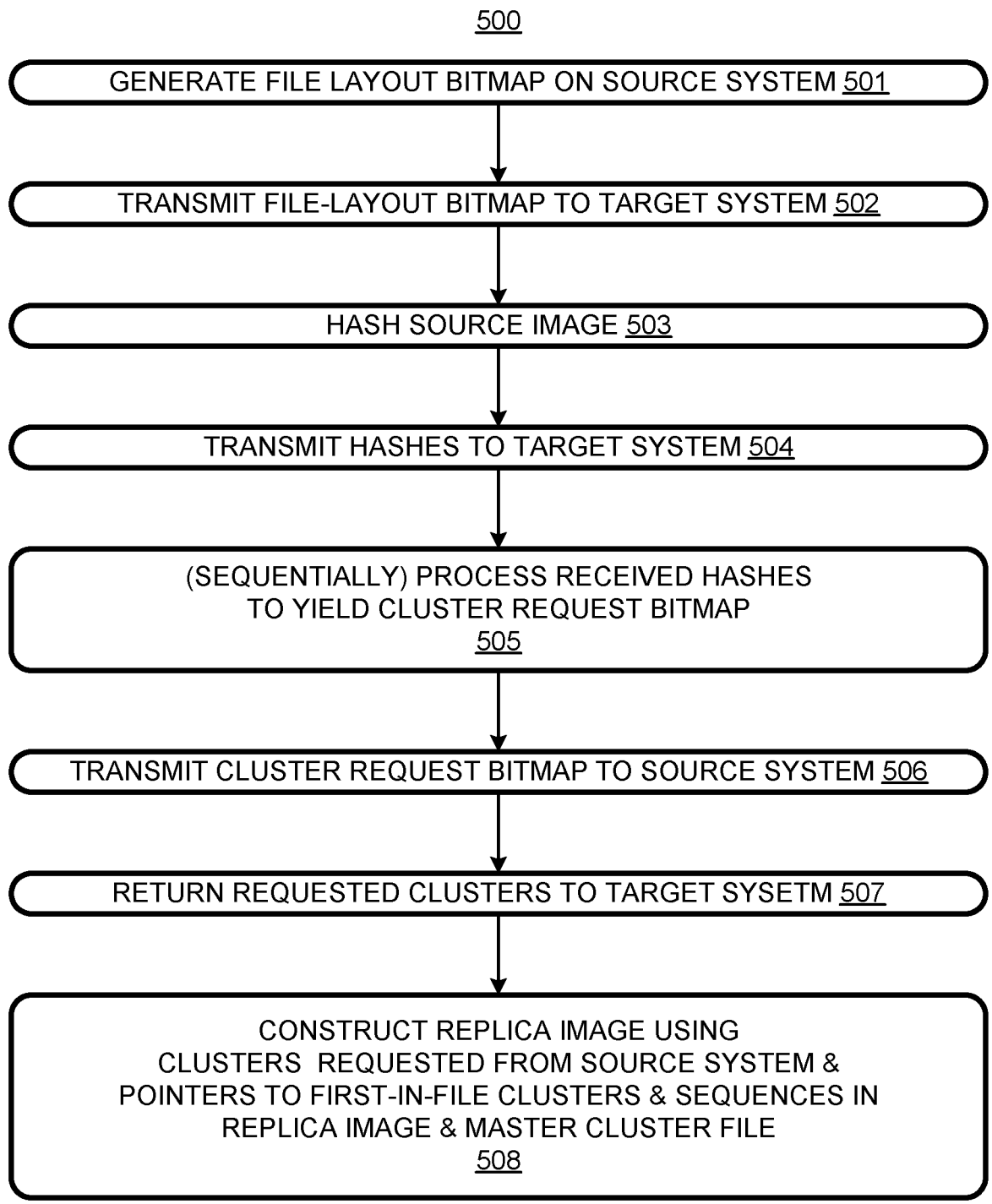
FIG. 5 is a teleportation process including deduplication implementable in the network of FIG. 4.

A process 500 in which deduplication is used during transfer is flow-charted in FIG. 5. Process 500 is a teleportation process in that a replica of a source image on a source system is constructed on a target system at least in part using pointers to clusters that were resident on the target system before the process began.

At 501, a file-layout bitmap is generated identifying first-in-file clusters among the clusters of an image, e.g., a virtual-machine disk image, on a source system. At 502, the file-layout bitmap is transmitted to a target system. At 503, the source image can be hashed to yield hashes in a source hash file. At 504 the hashes are transmitted to the target system. The hashes in the source hash file are arranged in the same order that the clusters are arranged in the source image. Thus, the file-layout bitmap can be used to identify the hashes that correspond to first-in-file clusters of the source image.

At 505, the received hashes are sequentially processed to yield a cluster-request bitmap that indicates which source clusters need to be transferred from source to target, and which source clusters do not need to be transferred because equivalent clusters already reside on the target or because other equivalent clusters are already slated to be transmitted from the source cluster. This processing of hashes is detailed further below with reference to FIG. 6.

At 506, the cluster request bitmap is transmitted from the target system to the source system. The source system transmits (returns) the requested clusters to the target system at 507. At 508, a replica of the source image is constructed on the target system using clusters from the source image, and pointers to first-in-file clusters and cluster sequences including first-in-file clusters found in the replica image or in a master cluster file on the target system.

Figure 6:
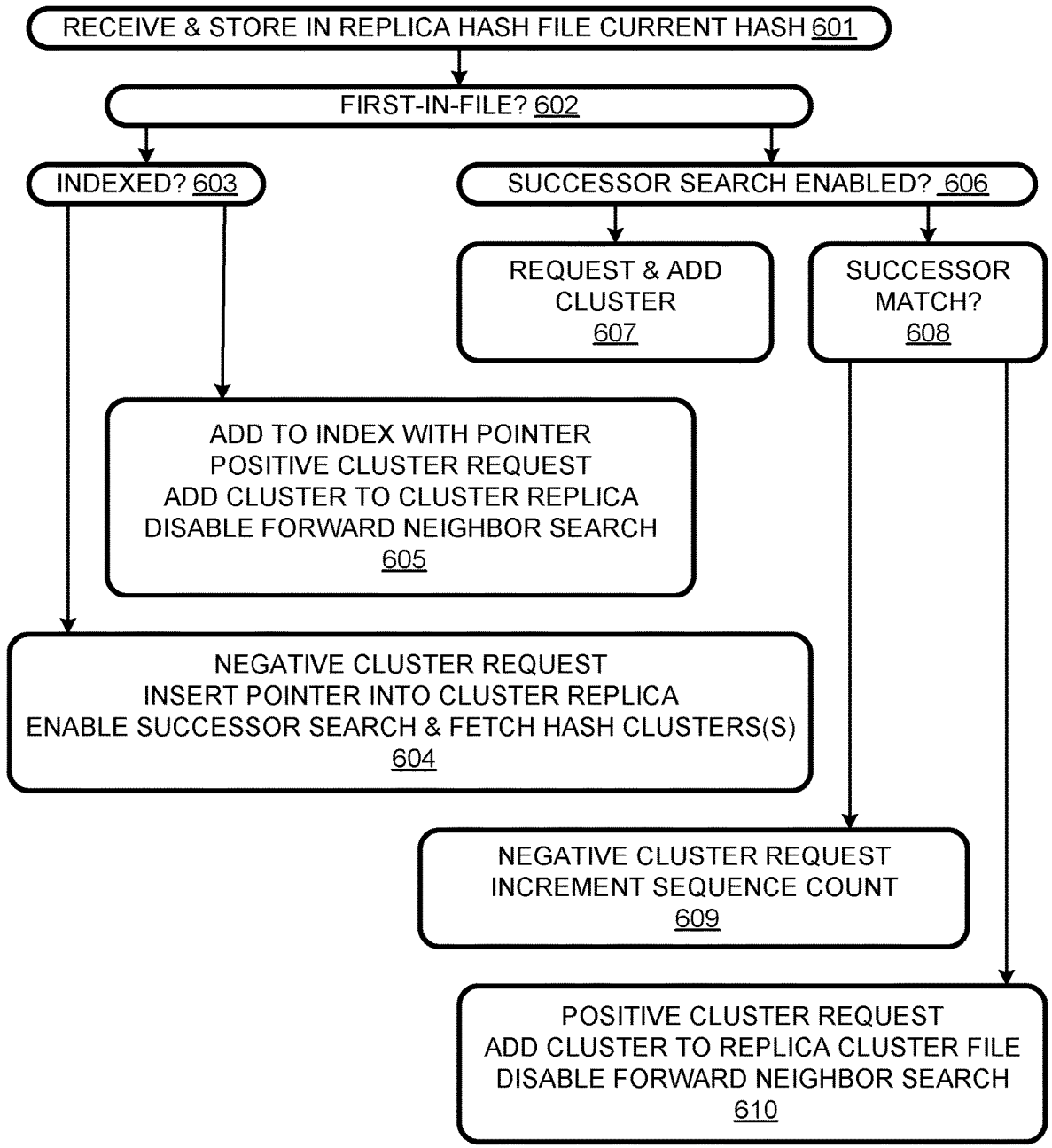
FIG. 6 is a flow chart of a process for handling received hashes as called for by the process of FIG. 5.

The processing of hashes at 505 is detailed in FIG. 6. At 601, a hash is received; a copy is stored at its respective location in the replica hash file on the target system. At 602, a determination is made whether or not the hash has been determined to be a first-in-file hash, that is, a hash of a first-in-file cluster. This determination is made based on the bit value in the position of the file-layout bitmap that corresponds to the position of the current hash. In the event the current hash is determined to be a first-in-file hash, then a determination is made at 603 whether or not an equivalent hash (a hash with the same value as the current hash) is present in the hash index, that is, the in-memory data structure that associates first-in-file hashes with their locations and, thus, of their respective clusters.

In the event that the current hash is matched by an already-indexed hash, then either: there is a cluster that is equivalent to the cluster on the target system that is equivalent to the cluster used to generate the current hash, or an equivalent hash is to be requested from the source system. In either case, it is not necessary to request that the respective cluster for the current hash be transmitted from the source system to the target system. Accordingly, at 604, a negative indication is entered at the appropriate location of the cluster request bitmap on the target system. Also, a pointer to the current or future location of the equivalent cluster can be inserted into the replica of the source image being constructed.

Moreover, at 604, a flag is set enabling a forward search that can affect the processing of the next hash to be processed. The successor (forward neighbor) search generally involves a disk or other mass-storage access of one or more clusters of hashes from the master hash file or the replica hash file. However, in view of the precondition of a first-in-file match, the likelihood of a highly compressible match for a sequence of clusters is relatively high. In the event that more than one hash cluster is required, the hash clusters to be fetched are sequential and can be fetched in anticipation of the need for the additional clusters.

In the event, at 603, it is determined that the current (first-in-file) hash is not represented in the index, at 605, the current hash is added to the index and associated with a pointer to the intended location of the first-in-file cluster from which the current hash was generated. Since no match was found, no equivalent cluster has been found on the target system and no equivalent cluster is slated for transmission from the source system to the target system. Accordingly, a request for the respective cluster is indicated in the cluster request bitmap to be transmitted from the target system to the source system. In response to the request, the respective cluster is to be transmitted and stored at the location associated with the pointer associated with the current hash. Since there was no matching hash, the successor search is disabled by resetting the respective flag.

In the event that, at 602, it is determined that the current hash is not a first-in-file hash, then, at 606, a determination is made whether a successor search is enabled. In the event that, at 606, it is determined that a successor search is not enabled, then, at 607, a request is made for transfer of the respective cluster for the current hash. Once the respective cluster is transferred, it is added to its respective location in the replica cluster file.

In the event, at 606, it is determined that a forward neighbor search is enabled, then at 608, a determination is made whether the current hash matches the corresponding successor of the most-recently matched indexed first-in-file hash. The determination at 607 is based on a comparison of the current hash with a corresponding hash fetched at 604.

If, at 608, the current (non-first-in-file) hash is matched with a hash from the master hash file, then a cluster equivalent to the respective cluster for the current hash resides on the target system. If, at 608, the current hash is matched with a hash already in the replica hash file, then a cluster equivalent to the respective cluster for the current hash is already slated for transfer from the source system to the target system. In either case, there is no need to transfer the respective cluster for the current hash. Accordingly, at 608, an indication is made in the cluster-request bitmap that transfer of the respective cluster is not requested.

Since, at 609, the respective cluster is not to be transferred, in some embodiments, a pointer to an equivalent cluster can be inserted into the replica cluster file. However, instead of including a separate pointer for each non-first cluster of a matched sequence of clusters, some embodiments include only pointers to the first and last clusters of a matched sequence. In the illustrated embodiment, a pointer to the first cluster of a sequence is included in the cluster replica file and a count is maintained tracking the number of clusters in the matched sequence. In this embodiment, the count is incremented at 609. Also, at 609, the successor search remains enabled.

In the event, at 608, it is determined that the successor hashes do not match, then, at 610, a positive request is indicated in the cluster-request bitmap at 610. One the respective cluster is transferred, it is stored in its respective location in the replica cluster file. In view of the mismatch, the successor is disabled as sequence matching based on the most-recent first-in-file hash has terminated.

In some variations, there are boundary conditions not represented in FIG. 6 that can result in termination of a successor search. For example, if the current hash is the last source hash, then action 505, including any ongoing successor search, terminates. Depending on the implementation, action 505 can continue with successor search disabled, for example, if a matched hash is: the last hash of the master hash file, the last hash of a fetched hash cluster, or the last hash of a master hash sequence.

Historically, a "disk image" is an arrangement of data on a hard disk. A typical disk operating system can access this data in clusters of bits (zeroes and ones). A "cluster" is a smallest unit that an operating system can access on a disk. Clusters sizes depend on the operating system, with 32768 bits (4096 bytes) being common for modern operating systems and disks. Typically, an operating system will store a data file so that it starts at the leading boundary of a cluster. Operating systems then try to arrange multi-cluster files so that they extend over successive clusters. Today, "disk image" can refer to data that is not a hard disk image, but that is arranged in a format used for hard disks.

A "virtual machine" is a software entity that appears to a (guest) operating system as if it were a computer (physical machine). A "hypervisor" is an operating system that virtualizes hardware to define a virtual machine. The virtual machine can run a guest operating system, which in turn can run application software. A virtual machine (including the guest operating system and application) can be stored as a file having the same data format as a hard disk. This file can thus be referred to as a "virtual-machine disk image". As is the case with a hard disk image, a virtual-machine disk image can extend over consecutive clusters and have its start aligned with a cluster boundary.

Herein, a "hash" is an identifier, e.g., of a cluster, designed so that, if the hashes of two clusters match, then the clusters match. More precisely, if two hashes match, then the likelihood that their respective clusters do not match is negligible. A hash can be much shorter than the cluster (or other value) it represents. For example, a 256-bit (32-byte) hash can represent a 32768-bit (4096-byte) cluster. Hashes can be stored, e.g., on disk, in an order matching the order in which the corresponding clusters are stored to maintain a simple correspondence between clusters and their hashes. Like other data objects, hashes can be stored in clusters, e.g., 128 256-bit hashes per 32768-bit cluster. For clarity, the clusters that are hashed can be referred to as "disk-image clusters", while the clusters in which the resulting hashes are arranged can be referred to as "hash clusters".

Herein, "seed" is a label used to distinguish two mutually exclusive subsets ("seed clusters" and "non-seed clusters") of clusters of a virtual-machine disk image or other disk image. The label "seed" is intended to suggest a starting point for a matching process. In the illustrated embodiments, seed clusters are compared. In the event of a match between seed clusters, a neighbor search is conducted either forward, backward or both, from the position of the seed clusters. The seed cluster may be a cluster that is determined to be or is determined likely to be a cluster aligned with a file start. In such a case, a match of first-in-file clusters would be followed by a forward neighbor (successor) search.

Herein, a "neighbor search" can include a forward search, a rearward search, or both. A forward-neighbor search, aka, successor search, starts respective positions of matched seed hashes and compares the immediate successors of the seed hashes. If there is a match, the immediate successors of the immediate successors of the matching seed hashes are compared. The searching is extended until some terminating condition is detected. Terminating conditions can include detecting a mismatch between hashes, reaching a cluster boundary, or encountering a seed hash.

For each match between hashes, at least one of the respective clusters can be replaced with a pointer to an equivalent cluster. For example, if clusters A and B match, then cluster A can be replaced with a pointer to cluster B. For example, a 32768-bit (4096-byte) cluster can be replaced with a 64-bit (8-byte) pointer for 512:1 data reduction per replacement. This reduction can represent a substantial savings in storage space and/or in communications bandwidth.

All art labeled "prior art", if any, is admitted prior art. All art not labelled "prior art" is not admitted prior art. The illustrated embodiments, variations thereupon, and modifications thereto are provided for by the present invention, the scope of which is defined by the following claims.

What is claimed is:

1. A process comprising:
    selecting seed clusters from a set of disk-image clusters to define a set of seed clusters and a set of non-seed clusters, wherein each seed cluster is a cluster that corresponds to a start of a file stored in one or more disk-image clusters or is likely to correspond to the start of a file;

hashing the seed clusters and at least some of the non-seed clusters to yield seed hashes and non-seed hashes collectively arranged in hash clusters, the hash clusters including a non-empty set of seed-containing hash clusters that contain at least one seed hash each, hashes being arranged in hash clusters in an order corresponding to the order of the respective disk-image clusters;

storing in memory seed-containing hash clusters so that the seed clusters are represented in memory by respective seed hashes and at least some non-seed clusters are not represented in memory by respective non-seed hashes;

comparing hashes of the seed-containing hash clusters to identify matching clusters; and replacing at least some matching clusters with pointers to other matching clusters.

2. The process of claim 1 wherein for each match between hashes of the seed-containing hash clusters, the process further comprises:

comparing non-seed successor hashes for each matching seed-containing hash cluster, wherein each non-seed successor hash corresponds to a cluster having a location in the disk-image immediately following the corresponding seed cluster; and replacing at least some matching non-seed clusters with pointers to other matching non-seed clusters.

3. The process of claim 2 wherein the selecting is based on a determination that a cluster contains the start of a file or on a determination of a likelihood that the cluster contains the start of a file.

4. The process of claim 3 wherein the disk image is a virtual-machine disk image of a virtual machine.

5. The process of claim 4 further comprising, prior to selecting seed clusters, installing an agent that identifies clusters that contain a file start, the disk image being a virtual-machine disk image of the virtual machine.

6. The process of claim 4 wherein the selecting includes applying an algorithm based on a guest file system to identify seed clusters.

7. The process of claim 4 wherein the selecting includes identifying seed clusters based on cluster contents.

8. The process of claim 7 wherein the selecting includes identifying a seed cluster based on a determination that a specified number of bytes of the seed cluster are indicative of a file start.

9. The process of claim 7 wherein the selecting includes identifying a seed cluster based on the contents of a preceding cluster.

10. The process of claim 9 wherein the seed cluster is identified based on a number of trailing zero bytes.

11. A system comprising non-transitory media encoded with code that, when executed by a processor, implements a method including:

selecting seed clusters from a set of disk-image clusters to define a set of seed clusters and a set of non-seed clusters, wherein each seed cluster is a cluster that corresponds to a start of a file stored in one or more disk-image clusters or is likely to correspond to the start of a file;

hashing the seed clusters and at least some of the non-seed clusters to yield seed hashes and non-seed hashes collectively arranged in hash clusters, the hash clusters including a non-empty set of seed-containing hash clusters that contain at least one seed hash each, hashes being arranged in hash clusters in an order corresponding to the order of the respective disk-image clusters;

storing in memory seed-containing hash clusters so that the seed clusters are represented in memory by respective seed hashes and at least some non-seed clusters are not represented in memory by respective non-seed hashes;

comparing hashes of the seed-containing hash clusters to identify matching clusters; and replacing at least some matching clusters with pointers to other matching clusters.

12. The system of claim 11 wherein for each match between hashes of the seed-containing hash clusters, the code, when executed, further implements the method comprising:

comparing non-seed successor hashes for each matching seed-containing hash cluster, wherein each non-seed successor hash corresponds to a cluster having a location in the disk-image immediately following the corresponding seed cluster; and replacing at least some matching non-seed clusters with pointers to other matching non-seed clusters.

13. The system of claim 12 wherein the selecting is based on a determination that a cluster contains the start of a file or on a determination of a likelihood that the cluster contains the start of a file.

14. The system of claim 13 wherein the disk image is a virtual-machine disk image of a virtual machine.

15. The system of claim 14 further comprising, prior to selecting seed clusters, installing an agent that identifies clusters that contain a file start, the disk image being a virtual-machine disk image of the virtual machine.

16. The system of claim 14 wherein the selecting includes applying an algorithm based on a guest file system to identify seed clusters.

17. The system of claim 14 wherein the selecting includes identifying seed clusters based on cluster contents.

18. The system of claim 17 wherein the selecting includes identifying a seed cluster based on its contents.

19. The system of claim 17 wherein the selecting includes identifying a seed cluster based on the contents of a preceding cluster.

20. The system of claim 19 wherein the seed cluster is identified based on a number of trailing zero bytes.

* * * * *